Sept. 10, 1946.   H. G. HUGHEY   2,407,370
FLAME HARDENING TORCH
Filed March 13, 1944
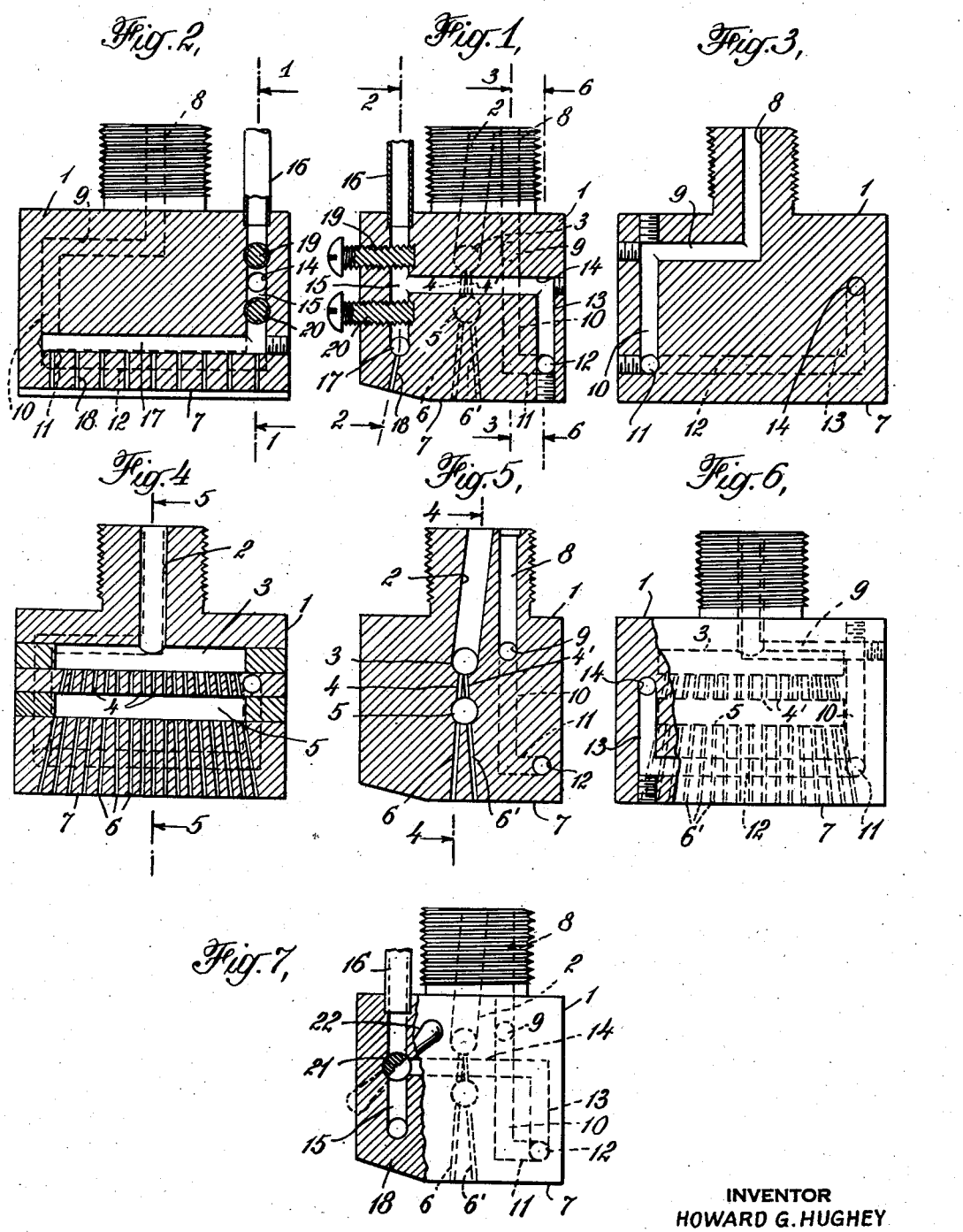
INVENTOR
HOWARD G. HUGHEY
BY
ATTORNEYS Patented Sept. 10, 1946

2,407,370

UNITED STATES PATENT OFFICE 2,407,370

FLAME HARDENING TORCH

Howard G. Hughey, Fanwood, N. J., assignor to Air Reduction Company, Incorporated, a corporation of New York Application March 13, 1944, Serial No. 526,194

4 Claims. (Cl. 266—4)

This invention relates to gas torches, such as oxy-acetylene torches, for use in flame hardening or otherwise heat treating metal articles.

Flame hardening torches have been proposed in which a cooling medium, such as water, is circulated through the torch and then discharged from orifices in the torch tip as quenching jets to quickly cool the metal surface that has been heated by the torch. For some heat treating operations it is not desirable to have all of the cooling water discharged from the quenching jets, but torches of the prior art have lacked means by which the amount of quenching water discharged from the quenching jets can be controlled.

The principal object of this invention is to provide a torch for flame hardening, or otherwise heat treating metal articles, having a system of passages through which a cooling medium, such as water, may be circulated, and having adjustable means for proportioning the amount of cooling water discharged from the torch through the return-flow pipe and the amount supplied to the quenching orifices.

The invention is illustrated in the accompanying drawing as applied to a torch having a tip of the block type.

In the drawing:

Figure 1 is a transverse vertical section through a torch tip embodying the invention, the section being taken on the line 1—1 of Fig. 2;

Fig. 2 is a vertical longitudinal section taken on the line 2—2 of Fig. 1;

Fig. 3 is a vertical longitudinal section taken on the line 3—3 of Fig. 1;

Fig. 4 is a vertical longitudinal section taken on the line 4—4 of Fig. 5;

Fig. 5 is a vertical transverse section taken on the line 5—5 of Fig. 4;

Fig. 6 is a front view of the torch partly in vertical longitudinal section taken on the line 6—6 of Fig. 1; and Fig. 7 is an end view, partly in transverse section, of a torch tip embodying the invention in a modified form.

As above stated the particular torch illustrated in the drawing is of the block-tip type. The block forming the tip of the torch is shown at 1. A combustible mixture of oxygen, and a fuel gas such as acetylene, is delivered to the torch tip through a vertical passage 2 (Figs. 1, 4 and 5). The passage 2 communicates with a longitudinal bore 3 constituting an upper distributing chamber for the gas mixture. The gas mixture is distributed by the distributing chamber 3 to two longitudinal rows of passages 4 and 4' which conduct it into a second longitudinal bore 5 constituting a lower distributing chamber. The gas mixture is distributed by the lower distributing chamber 5 to two rows of passages 6 and 6' which open through the face 7 of the torch tip, as best shown in Figs. 1, 4 and 5. The gas mixture issuing from the torch tip through the passages 6 and 6', when ignited, burns as flame jets to heat the surface of the metal work-piece which is to be surface hardened or otherwise heat treated by relative movement between the torch and the surface of the work-piece.

Any desired arrangement of passages in the torch tip may be used to circulate the cooling medium, such as water, through the tip. In the particular torch illustrated in the drawing the cooling water enters the torch tip through a vertical passage 8, best shown in Figs. 1, 2, 3 and 5, and passes toward the left end of the tip-block, as viewed in Figs. 2 and 3, through a horizontal passage 9. It then passes toward the face of the tip through a vertical passage 10 and then toward the front face of the tip-block through a short horizontal passage 11. The latter passage communicates with a longitudinal passage 12 through which the water is conducted toward the right end of the tip-block, as viewed in Figs. 2 and 3. Then it passes upwardly through a vertical passage 13 to a horizontal passage 14 which extends transversely of the block from front to rear, as best shown in Fig. 1. The passage 14 lies in a plane about mid-way of the height of the tip-block and delivers the water to a vertical passage 15 near the rear face of the block (Fig. 1). The transverse passage 14 communicates with the vertical passage 15 at a point intermediate the ends of the latter as clearly shown in Fig. 1. The upper portion of the vertical passage 15 constitutes an exit for the cooling water through which it passes into a return-flow pipe 16. The lower portion of the vertical passage 15 constitutes a branch of the cooling passages and leads to a longitudinal bore 17 which forms a distributing chamber for the portion of the water that is to be delivered to the quenching jets. A longitudinal row of quenching passages 18 communicate with the distributing chamber 17 and open through the face of the tip. Water issues from these passages as quenching jets for cooling the surface of the metal work-piece immediately after it has been heated by the heating flames.

A screw 19 is threaded into the tip-block 1 and is adapted to intercept or obstruct the exit portion of the vertical passage 15 at a point above the transverse passage 14. It may be adjusted so that it acts as a valve to control the amount of water permitted to escape through the exit portion of the passage 15 into the return-flow pipe 16. The screw 19 may be adjusted so that the exit portion of the passage 15 is fully open, fully closed, or partially open to any desired degree.

A similar screw 20 threaded into the tip-block acts as an adjustable valve to control, in a similar fashion, the amount of water that is permitted to pass through the lower portion of the passage 15 into the distributing chamber 17 for the quenching jets.

When the screw 19 is adjusted to fully close the upper portion of passage 15, and the screw 20 is adjusted to fully open the lower end of this passage, all of the cooling water admitted to the torch will be discharged through the quenching passages 18 as quenching jets, and they will have the full force of the cooling water supply. As above stated, for some heat treating operations it is not desirable to have all of the cooling water discharged by the quenching jets and in such case the screws 19 and 20 are so adjusted as to properly proportion the amount of water discharged as quenching jets and the amount that is discharged through the return-flow pipe 16 so that after the water circulates through the cooling passages the desired amount will go to the quenching jets and the rest will be discharged from the torch through the return-flow pipe. If desired, of course, the screw 20 may be adjusted to cut off the quenching jets entirely, and the screw 19 may be adjusted to allow all of the cooling water to be discharged from the torch through the return-flow pipe 16.

In the modification of Fig. 7 the two screws 19 and 20 are replaced by a three-way valve 21 at the junction of the transverse passage 14 and the vertical passage 15. The valve extends through the end of the tip-block and may be actuated in any suitable way as by means of a handle indicated at 22. When the valve 21 is in the position indicated in Fig. 7 all of the cooling water, after passing through the cooling passages to cool the block-tip, is diverted to the quenching passages, but it is obvious that the valve may be adjusted so that any desired amount of the water may go to the quenching jets and any desired amount may be discharged from the torch through the return-flow pipe 16.

I claim:

1. A gas torch having a tip, gas passages opening through the face of the tip from which a combustible gas mixture may issue to burn as heating flames, cooling passages through which cooling medium may be circulated to cool the tip, said cooling passages having an entrance through which cooling medium may be admitted and an exit through which cooling medium may pass and be discharged from the torch through a return-flow pipe after circulating through the cooling passages, quenching passages communicating with the cooling passages and opening through the face of the tip and from which cooling medium may issue as quenching jets, and adjustable means for proportioning the amount of cooling medium delivered to the quenching passages and the amount discharged through said exit of the cooling passages.

2. A gas torch having a tip, gas passages opening through the face of the tip from which a combustible gas mixture may issue to burn as heating flames, cooling medium passages through which cooling medium may be circulated to cool the tip, said cooling medium passages having an entrance through which cooling medium may be admitted and an exit portion through which cooling medium may pass and be discharged from the torch through a return-flow pipe after circulating through the cooling medium passages, quenching passages opening through the face of the tip, the cooling medium passages having a branch located near their exit portion to supply cooling medium to the quenching passages, adjustable means for controlling the amount of cooling medium supplied to the quenching passages by said branch, and adjustable means for controlling the amount of cooling medium discharged through said exit portion of the cooling passages.

3. A gas torch having a tip of the block type, gas passages in the block opening through the face of the tip from which a combustible gas mixture may issue to burn as heating flames, cooling medium passages in the block through which cooling medium may be circulated to cool the tip, a return-flow pipe through which cooling medium is discharged after circulating through the cooling medium passages, quenching passages in the block opening through the face of the tip, a distributing chamber in the block communicating with all of the quenching passages, said cooling medium passages including a section which communicates at one end with said distributing chamber and at its other end with said return-flow pipe, the cooling medium passages being arranged to deliver cooling medium to said section at a place intermediate its ends, adjustable means between said intermediate place and the return-flow pipe for controlling the amount of cooling medium discharged through the return-flow pipe, and adjustable means between said intermediate place and said distributing chamber for controlling the amount of cooling medium supplied to the distributing chamber and the quenching passages.

4. A gas torch having a tip of the block type, gas passages in the block opening through the face of the tip from which a combustible mixture may issue to burn as heating flames, cooling medium passages in the block through which cooling medium may be circulated to cool the tip, a return-flow pipe through which cooling medium is discharged after circulating through the cooling medium passages, quenching passages in the block opening through the face of the tip, a distributing chamber in the block communicating with all of the quenching passages, said cooling medium passages including a section which communicates at one end with said distributing chamber and at its other end with said return-flow pipe, the cooling medium passages being arranged to deliver cooling medium to said section at a place intermediate its ends, and three-way adjustable three-way valve means at said place to proportion the amount of cooling medium discharged through the return-flow pipe and the amount of cooling medium supplied to said distributing chamber for the quenching jets.

HOWARD G. HUGHEY.